United States Patent
Kim et al.

(10) Patent No.: US 9,385,879 B2
(45) Date of Patent: Jul. 5, 2016

(54) APPARATUS AND METHOD FOR TRANSMITTING AND RECEIVING MULTICAST DATA IN WIRELESS COMMUNICATION SYSTEM

(71) Applicant: LG ELECTRONICS INC., Seoul (KR)

(72) Inventors: Jeongki Kim, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 14/241,811

(22) PCT Filed: Oct. 10, 2012

(86) PCT No.: PCT/KR2012/008222
§ 371 (c)(1),
(2) Date: Feb. 27, 2014

(87) PCT Pub. No.: WO2013/055107
PCT Pub. Date: Apr. 18, 2013

(65) Prior Publication Data
US 2014/0204831 A1 Jul. 24, 2014

Related U.S. Application Data

(60) Provisional application No. 61/545,569, filed on Oct. 10, 2012, provisional application No. 61/546,551, filed on Oct. 12, 2011, provisional application No. 61/548,180, filed on Oct. 17, 2011.

(51) Int. Cl.
*H04L 12/18* (2006.01)
*H04W 4/06* (2009.01)
*H04W 4/00* (2009.01)
*H04L 29/06* (2006.01)

(52) U.S. Cl.
CPC .............. *H04L 12/189* (2013.01); *H04L 69/22* (2013.01); *H04W 4/005* (2013.01); *H04W 4/06* (2013.01)

(58) Field of Classification Search
None
See application file for complete search history.

(56) References Cited

U.S. PATENT DOCUMENTS

| 2007/0265012 A1 | 11/2007 | Sorbara et al. |
| 2008/0026750 A1 | 1/2008 | Harris et al. |

(Continued)

FOREIGN PATENT DOCUMENTS

| CN | 1951039 | 4/2007 |
| JP | 2010524401 | 7/2010 |

(Continued)

OTHER PUBLICATIONS

Multicast Operation for M2M Applications.*

(Continued)

*Primary Examiner* — Thai Nguyen
(74) *Attorney, Agent, or Firm* — Lee, Hong, Degerman, Kang & Waimey

(57) ABSTRACT

An apparatus and method for transmitting/receiving multicast data in a wireless communication system are disclosed. The method of receiving multicast data at a machine-to-machine (M2M) device in a wireless communication system includes: receiving, from a base station (BS), an M2M multicast connection identifier for an M2M multicast service, assigned to the M2M device; receiving a message including control information about transmission of the multicast data and multicast data including an M2M multicast connection identifier from the BS; and determining whether the M2M multicast connection identifier included in the multicast data corresponds to the M2M multicast connection identifier assigned by the BS.

7 Claims, 5 Drawing Sheets

(56) References Cited

U.S. PATENT DOCUMENTS

| | | |
|---|---|---|
| 2008/0037480 A1 | 2/2008 | Venkatachalam |
| 2011/0007683 A1 | 1/2011 | Kim et al. |
| 2012/0202543 A1* | 8/2012 | Murias ................ H04W 4/005 455/509 |

FOREIGN PATENT DOCUMENTS

| | | |
|---|---|---|
| KR | 10-2011-0081750 | 7/2011 |
| KR | 10-2011-0081751 | 7/2011 |
| KR | 10-2011-0083529 | 7/2011 |
| WO | 2005/101752 | 10/2005 |
| WO | 2008/130817 | 10/2008 |
| WO | 2011/006437 | 1/2011 |
| WO | 2011094951 | 8/2011 |

OTHER PUBLICATIONS

Etri, "Key Issue—MTC Identifiers update for compatibility," SA WG2 Temporary Document, SA WG2 Meeting #86, S2-113408, Jul. 2011, 2 pages.

PCT International Application No. PCT/KR2012/008222, Notification of Transmittal of the International Search Report and the Written Opinion of the International Searching Authority, or Declaration dated Mar. 28, 2013, 9 pages.

Korean Intellectual Property Office Application Serial No. 10-2012-0033482, Notice of Allowance dated Jul. 16, 2012, 2 pages.

The State Intellectual Property Office of the People's Republic of China Application No. 201280049747.5, Office Action dated Mar. 29, 2016, 15 pages.

Etri, Multicast Operation for M2M Applications, IEEE C802.16p-11/0076, May 6, 2011, 3 pages.

LF Electronics, "M2M Multicast Assignment in IEEE P802.16 Rev3", IEEE C802.16p-11/0219, Sep. 9, 2011, 3 pages.

ITRI, "Clarifications to Multicast Procedure and Uplink Report (Idle Mode)", IEEE C802.16p-11/0137, Jul. 10, 2011, 3 pages.

LG Electronics, "Multicast operation for M2M application in 802.16-2009", IEEE 802.16p-11/0113r2, May 18, 2011, 3 pages.

Samsung Electronics, "Multicast MAP IE modification to support multicasting for M2M", IEEE C80216p-11/0056r1, May 12, 2011, 4 pages.

* cited by examiner

APPARATUS AND METHOD FOR TRANSMITTING AND RECEIVING MULTICAST DATA IN WIRELESS COMMUNICATION SYSTEM

CROSS-REFERENCE TO RELATED APPLICATIONS

This application is the National Stage filing under 35 U.S.C. 371 of International Application No. PCT/KR2012/008222, filed on Oct. 10, 2012, which claims the benefit of earlier filing date and right of priority to Korean Application No. 10-2012-0033482, filed on Mar. 30, 2012, and also claims the benefit of U.S. Provisional Application Ser. No. 61/545,569, filed on Oct. 10, 2011, 61/546,551, filed on Oct. 12, 2011, and 61/548,180, filed on Oct. 17, 2011, the contents of which are all hereby incorporated by reference herein in their entirety.

TECHNICAL FIELD

The present invention relates to wireless communication and, more particularly, to an apparatus and method for transmitting/receiving multicast data in a wireless communication system.

BACKGROUND ART

Machine-to-machine (M2M) communication is communication between electronic devices as its appellation implies. While M2M communication means wired or wireless communication between electronic devices or communication between a human-controlled device and a machine in the broadest sense, these days M2M communication typically refers to wireless communication between electronic devices.

When the concept of M2M communication was introduced in the early 1990s, it was regarded merely as the concept of remote control or telematics and the market therefor was very limited. However, M2M communication has been drastically developed and the M2M communication market has attracted much attention all over the world over the past few years. Especially, M2M communication has a great influence in the fields of fleet management, remote monitoring of machines and facilities, smart metering for automatically measuring the working time of construction equipment and the consumption of heat or electricity, etc. in the Point Of Sales (POS) market and security-related applications. It is expected that M2M communication will find various uses in conjunction with legacy mobile communication, very high-speed wireless Internet or Wireless Fidelity (WiFi), and low-output communication solutions such as ZigBee and thus will extend to Business to Customer (B2C) markets beyond Business to Business (B2B) markets.

In the era of M2M communication, every machine equipped with a Subscriber Identity Module (SIM) card can be managed and controlled remotely because it is possible to transmit data to and receive data from the machine. For example, M2M communication is applicable to a very broad range including numerous terminals and equipment such as a car, a truck, a train, a container, an automatic vending machine, a gas tank, etc.

Conventionally, mobile stations are generally individually managed so that one-to-one communication was mainly performed between a base station and a mobile station. Assuming that numerous M2M devices communicate with the base station through one-to-one communication, network overload is expected due to signaling generated between each of the M2M devices and the base station. If M2M communication is rapidly spread and extensively used as described above, an overhead problem may occur due to communication between the M2M devices or between the M2M devices and the base station.

Owing to characteristics of M2M devices, M2M devices operating in an idle mode can be enabled when an event is generated and, for multicast data reception, enabled in order to receive multicast data in a predetermined period. However, there has not been proposed a method for efficiently transmitting/receiving multicast data between M2M devices and a BS.

DISCLOSURE OF INVENTION

Technical Problem

An object of the present invention is to provide a method for, at an M2M device, receiving multicast data in a wireless communication system.

Another object of the present invention is to provide a method for, at a BS, transmitting multicast data in a wireless communication system.

Another object of the present invention is to provide an M2M device for receiving multicast data in a wireless communication system.

Another object of the present invention is to provide a BS for transmitting multicast data in a wireless communication system.

The technical problems solved by the present invention are not limited to the above technical problems and those skilled in the art may understand other technical problems from the following description.

Solution to Problem

The object of the present invention can be achieved by providing a method of receiving multicast data at a machine-to-machine (M2M) device in a wireless communication system, which includes: receiving, from a base station (BS), an M2M multicast connection identifier for an M2M multicast service assigned to the M2M device; receiving a message including control information about transmission of the multicast data and multicast data including an M2M multicast connection identifier from the BS; and decoding the received multicast data to determine whether the M2M multicast connection identifier included in the received multicast data is identical to the M2M multicast connection identifier assigned by the BS. The method may further include acquiring the received multicast data if the M2M multicast connection identifier included in the multicast data is identical to the M2M multicast connection identifier assigned by the BS.

In another aspect of the present invention, there is provided a method of transmitting multicast data at a BS in a wireless communication system, which includes: transmitting an M2M multicast connection identifier for an M2M multicast service assigned to an M2M device; transmitting a message including control information about transmission of the multicast data and transmitting multimedia data including an M2M multicast connection identifier to the M2M device, wherein the M2M multicast connection identifier included in the transmitted multicast data is identical to the M2M multicast connection identifier assigned to the M2M device. The assigned M2M multicast connection identifier may be transmitted during a DSA procedure with the BS.

In another aspect of the present invention, there is provided an M2M device for receiving multicast data in a wireless communication system, which includes a receiver configured to receive, from a BS, an M2M multicast connection identifier for an M2M multicast service assigned to the M2M device, a message including control information about transmission of the multicast data from the BS and multicast data including an M2M multicast connection identifier from the BS, and a processor configured to decode the received multicast data to determine whether the M2M multicast connection identifier included in the received multicast data is identical to the M2M multicast connection identifier assigned by the BS. The processor may further configured to acquire the received multicast data if the M2M multicast connection identifier included in the multicast data is identical to the M2M multicast connection identifier assigned by the BS. The processor may further configured to discard the received multicast data if the M2M multicast connection identifier included in the multicast data is not identical to the M2M multicast connection identifier assigned by the BS.

In another aspect of the present invention, there is provided a BS for transmitting multicast data in a wireless communication system, which includes a transmitter configured to transmit an M2M multicast connection identifier for an M2M multicast service assigned to an M2M device, a message including control information about transmission of the multicast data to the M2M device and transmitting multimedia data including an M2M multicast connection identifier to the M2M device, wherein the M2M multicast connection identifier included in the transmitted multicast data is identical to the M2M multicast connection identifier assigned to the M2M device.

Advantageous Effects of Invention

According to the embodiments of the present invention, it is possible to improve communication performance by efficiently receiving/transmitting M2M multicast data. Furthermore, it is possible to efficiently perform CID update to prevent communication performance deterioration.

The effects of the present invention are not limited to the above-described effects and other effects which are not described herein will become apparent to those skilled in the art from the following description.

BEST MODE FOR CARRYING OUT THE INVENTION

Figure 1:
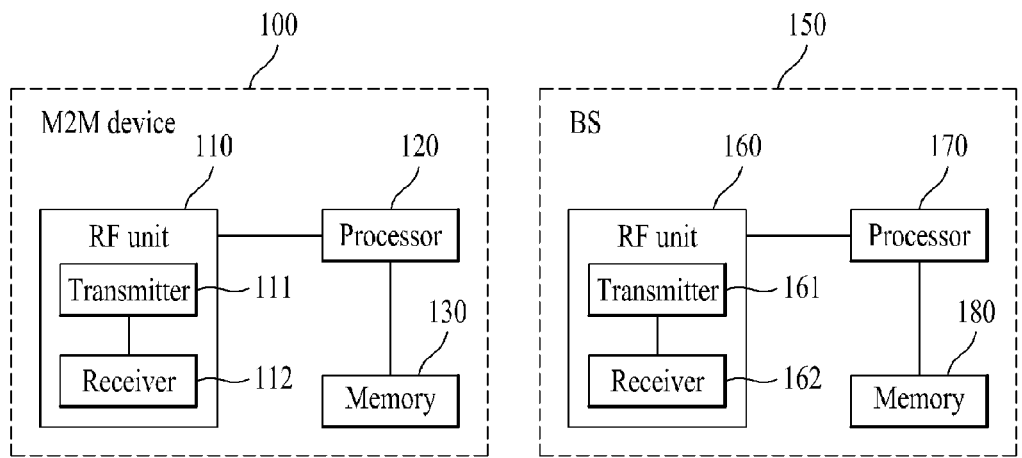
FIG. 1 is a diagram schematically explaining the configuration of an M2M device and a BS according to an exemplary embodiment of the present invention.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a mobile communication system conforming to Institute of Electrical and Electronics Engineers (IEEE) 802.16 and 3GPP (3rd Generation Partnership Project) is being used. However, the description is applicable to any other mobile communication system except for specific features inherent to IEEE 802.16 and 3GPP.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), an Advanced Mobile Station (AMS), a machine to machine (M2M) device, etc. In addition, the term Base Station (BS) generically refers to any node at a network end which communicates with a UE, such as a Node B, an evolved Node B (eNode B), an Access Point (AP), etc.

In a mobile communication system, an MS can receive information from a BS on downlink and transmit data to the BS on uplink. Information transmitted from or received at the MS includes data and various types of control information. There are many physical channels depending on the types and usages of information transmitted from or received at MSs.

The embodiments of the present invention are applicable to a variety of wireless access systems such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as IEEE 802.11 (Wireless Fidelity (Wi-Fi)), IEEE 802.16 (Worldwide interoperability for Microwave Access (WiMAX)), IEEE 802-20, Evolved UTRA (E-UTRA), etc. UTRA is a part of Universal Mobile Telecommunications System (UMTS). 3GPP LTE is a part of Evolved UMTS (E-UMTS) using E-UTRA, employing OFDMA for downlink and SC-FDMA for uplink. LTE-A is an evolution of 3GPP LTE.

Hereinafter, M2M communication refers to communication between Mobile Stations (MSs) via a Base Station (BS), between a BS and MSs without human intervention, or between M2M devices. Accordingly, M2M devices refer to MSs which can support the above M2M communication. An Access Service Network (ASN) for an M2M service is defined as an M2M ASN and a network entity communicating with M2M devices is called an M2M server. The M2M server executes an M2M application and provides an M2M specific service for one or more M2M devices. An M2M feature indicates the feature of an M2M application and one or more features may be necessary to provide the application. An M2M device group refers to a group of M2M devices which share one or more common features.

Devices performing communication according to an M2M scheme (which may be called M2M devices, M2M communication devices, Machine Type Communication (MTC) devices, etc.) will increase in number in a given network as machine application types thereof increase. Machine application types under consideration are (1) security; (2) public safety; (3) tracking and tracing; (4) payment; (5) healthcare; (6) remote maintenance and control; (7) metering; (8) consumer devices; (9) fleet management in Point Of Sale (POS)-related and security-related application markets; (10) communication between devices at a vending machine; (11) remote control of machines and facilities and smart metering for automatically measuring the operation time of construction machines and facilities and heat or power consumption; and (12) surveillance video communication, which should not be construed as limiting the present invention. Besides, many other machine application types are being discussed.

Another feature of M2M devices is that they have low mobility, that is, they seldom move once installed. In other words, the M2M devices are stationary for a considerably long time. An M2M communication system may simplify or optimize mobility related operations for a specific M2M application having a fixed location, such as secured access and surveillance, public safety, payment, remote maintenance and control, and metering.

Hereinafter, the exemplary embodiments of the present invention will be described when M2M communication is applied to a wireless communication system (e.g. IEEE 802.16e/m). However, the present invention is not limited thereto and is applicable to other wireless communication systems such as 3GPP LTE systems.

FIG. 1 is a diagram schematically explaining the configuration of an M2M device and a BS according to an exemplary embodiment of the present invention.

Referring to FIG. 1, an M2M device 100 (which may be called an M2M communication device) may include a Radio Frequency (RF) unit 110 and a processor 120. A BS 150 may include an RF unit 160 and a processor 170. The M2M device 100 and the BS 150 may selectively include memories 130 and 180, respectively. The RF units 110 and 160 may respectively include transmitters 111 and 161, and receivers 112 and 162. The transmitter 111 and the receiver 112 of the M2M device 100 are configured to transmit and receive signals to and from the BS 150 and other M2M devices. The processor 120 is functionally connected to the transmitter 111 and the receiver 112 so that the processor 120 may control the transmitter 111 and the receiver 112 to exchange signals with other devices. The processor 120 may process signals to be transmitted and transmit the processed signals to the transmitter 111. The processor 120 may process signals received by the receiver 112. If necessary, the processor 120 may store information included in exchanged messages in the memory 130.

With such a configuration, the M2M device 100 may perform methods of various embodiments of the present invention which will be described below.

Meanwhile, although not shown in FIG. 1, the M2M device 100 may additionally include a variety of configurations according to an application type thereof. For example, if the M2M device 100 is for smart metering, the M2M device 100 may include an additional configuration for power measurement, and an operation for such power measurement may be controlled by the processor 120 shown in FIG. 1 or an additionally configured processor (not shown).

Although, in FIG. 1, the case in which communication between the M2M device 100 and the BS 150 is performed is shown by way of example, an M2M communication method according to the present invention may be performed between one or more M2M devices, and each device may carry out methods according to various embodiments, which will be described below, with the same configuration as that of the device shown in FIG. 1.

The transmitter 161 and the receiver 162 of the BS 150 are configured to transmit and receive signals to and from other BSs, M2M servers, and M2M devices. The processor 170 is functionally connected to the transmitter 161 and the receiver 162 so that the processor 170 may control the transmitter 161 and the receiver 162 to exchange signals with other devices. The processor 170 may process signals to be transmitted and transmit the processed signals to the transmitter 161. The processor 170 may process signals received by the receiver 162. If necessary, the processor 170 may store information included in exchanged messages in the memory 180. With such a configuration, the BS 150 may perform methods of various embodiments of the present invention which will be described below.

The processors 120 and 170 of the M2M device 110 and the BS 150 direct (e.g. control, adjust, manage, etc.) operations of the M2M 110 and the BS 150, respectively. The processors 120 and 170 may be respectively connected to the memories 130 and 180 which store program codes and data. The memories 130 and 180 connected respectively to the processors 120 and 170 store operating systems, applications, and general files.

Each of the processors 120 and 170 of the present invention may be called a controller, a microcontroller, a microcomputer, etc. Meanwhile, each of the processors 120 and 170 may be implemented by hardware, firmware, software, or combinations thereof. When the embodiments of the present invention are implemented using hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), or the like, devised to perform the present invention, may be included in the processors 120 and 170.

Meanwhile, when the embodiments of the present invention are implemented using firmware or software, the firmware or software may be configured to include a module, a procedure, or a function which performs the function or operation of the present invention. The firmware or software configured to be able to perform the present invention may be included in the processors 120 and 170 or may be stored in the memories 130 and 180 so as to be executed by the processors 120 and 170.

An exemplary embodiment of the present invention proposes a structure of an identifier (ID) used when an M2M application is transmitted in the form of a multicast service in a broadband wireless access system which supports the M2M application and a resource allocation method for multicast data transmission using the ID.

A multicast and broadcast service (MBS) in a legacy IEEE 802.16e system will now be briefly described. The MBS provides an efficient method for concurrent transport of data common to a group of users, using a common multicast connection identifier (CID). The MBS is offered in downlink only and may be coordinated and optionally synchronized among a group of BSs to allow macro-diversity. The service flows associated with the MBS have certain QoS parameters and may require encryption performed using a globally defined sequence of TEKs. Since a multicast connection is associated with service flow, it is associated with the QoS and traffic parameters for service flow. All service flows to transmit the same MBS flows, created on any SS, shall have the same service flow management encoding for a QoS parameter set.

Service flows to carry MBS data are instantiated on an individual SS participating in the service while in normal operation. During such instantiation, the SS learns the parameters that identify the service and associated service flows. Each BS capable of providing the MBS belongs to a certain MBS zone, defined as a set of BSs where the same CID and same security association (SA) are used for transmitting the content of certain service flow(s). Each MBS zone is identified by a unique MBS zone identifier MBS_Zone ID. To ensure proper multicast operation on networks of a BS employing the MBS, the CIDs used for common MBS content and service shall be the same for all BSs within the same MBS zone. This allows the SS which has already registered with a service to be seamlessly synchronized with MBS transmissions within an MBS zone without communicating in UL or re-registering with other BSs within that MBS zone. MBS zone IDs shall not be reused across any two adjacent MBS zones.

ARQ and HARQ are not applicable to multicast connections as there is no feedback from the SS at layer 1 or layer 2. However, the MBS may be used with time-diversity similar to that used in HARQ transmission, where some HARQ parameters are used for MBS bursts to allow proper sequencing and time diversity combination when MBS bursts are repeatedly transmitted, but without any layer 1 or layer 2 acknowledgements from the SS.

Logical channel IDs, which pair with multicast CID in the extended MBS data IE, are allocated to each MBS content ID value in the order that it is included in the MBS contents IDs TLV. As a result, an SS can receive multiple MBS messages for an MBS connection with different MBS contents distinguished by a logical channel ID belonging to a multicast CID. The BS shall allocate MBS SDUs in the order defined in the extended MBS data IE. The following table 1 shows a CID range in IEEE 802.16e systems.

TABLE 1

| CID | Value | Description |
| --- | --- | --- |
| Ranging CID | 0x0000 | Used by SS and BS during ranging process. |
| Basic | 0x0001-m | The same value is assigned to both the DL and UL connection. |
| Primary Management | m + 1-2m | The same value it assigned to both the DL and UL connection. |
| Transport; Secondary Management | 2m + 1-0xFE9F | For the secondary management connection, the same value is assigned to both the DL and UL connection. |
| Multicast CIDs | 0xFEA0-0xFEFE | For the DL multicast service, the same value is assigned to all MSs on the same channel that participate in this connection. |
| AAS Initial Ranging | 0xFEFF | A BS supporting AAS shall use this CID when allocating an AAS ranging period (using AAS Ranging Allocation IE). |
| Multicast Polling | 0xFF00-0xFFF9 | A MS may be included in one or more multicast polling groups for the purposes of obtaining bandwidth via polling. These connections have no associated service flow. |
| Normal Mode Multicast | 0xFFFA | Used in DL-MAP to denote bursts for transmission of DL broadcast information to normal mode MS. |
| Sleep Mode Multicast | 0xFFFB | Used in DL-MAP to denote bursts for transmission of DL broadcast information to sleep mode MS. May also be used in MOB_TRF-IND messages. |
| Idle Mode Multicast | 0xFFFC | Used in DL-MAP to denote bursts for transmission of DL broadcast information to idle mode MS. May also be used in MOB_PAG-ADV messages. |
| Fragmentable Broadcast | 0xFFFD | Used by the BS for transmission of management broadcast information with fragmentation. The fragment subheader shall use 11-bit FSN on this connection. |
| Padding | 0xFFFE | Used for transmisstion of padding information by SS and BS. |
| Broadcast | 0xFFFF | Used for broadcast information that is transmitted on a DL to all SS. |

It can be known from Table 1 that multicast CIDs are used for a downlink multicast service. The following table 2 shows an exemplary MBS MAP message format.

TABLE 2

| Syntax | Size (bit) | Notes |
|---|---|---|
| MBS_MAP Message format ( ){ | — | — |
|   Management Message Type = 62 | 8 | 62 |
|   MBS_DIUC_Change_Count | 8 | — |
|   #MBS_DATA_IE | 4 | The number of included MBS DATA IEs |
|   for (i = 0; i < n; i++){ | — | n = #MBS DATA IEs |
|     MBS_DATA_IE | variable | — |
|   } | — | — |
|   #Extended_MBS_DATA_IE | 4 | The number of included Extended MRS DATA IEs |
|   for(i = 0; i < k; i++) { | — | k = #Extended MBS DATA IEs |
|     Extended_MBS_DATA IE( ) | variable | — |
|   } | — | — |
|   #MBS_DATA_Time_Diversity_IE | 4 | The number of included MBS DATA Time Diversity IEs |
|   for(i = 0; i < m; i++){ | — | m = #MBS DATA Time Diversity IEs |
|     MBS_DATA_Time_Diversity_IE( ) | variable | — |
|   } | — | — |
|   if(!byte boundary){ | — | — |
|     Padding Nibble | 4 | — |
|   } | — | — |
|   TLV encoding element | — | — |
| } | — | — |

In Table 2, the MBS_MAP message is transmitted as a broadcast CID and the MBS_MAP message format is located in a first symbol and a first sub null within a downlink permutation zone for MBS transmission if the downlink permutation zone is present. The MBS_MAP message includes MBS_DATA_IE, MBS_DATA_Time_Diversity_IE, and Extended_MBS_DATA_IE and each IE defines access information of MBS burst. The following table 3 shows an MBS_DATA_IE message format.

TABLE 3

| Syntax | Size (bit) | Notes |
|---|---|---|
| MBS_DATA_IE( ) { | — | — |
|   MBS_MAP Type = 0 | 2 | MBS_DATA_IE |
|   MBS Burst Frame Offset | 2 | This indicates the burst located by this IE will be shown after MBS Burst Frame Offset + 2 frames. |
|   Next MBS MAP change indication | 1 | This indicates whether the size of MBS MAP message of next MBS frame for these Multicast CIDs included this IE will be different from the size of this MBS MAP message. |
|   No. of Multicast CID | 3 | — |
|   for(i = 0; i < No. of Multicast CID: i++){ | — | — |
|     Multicast CID | 12 | 12 LSBs of CID for multicast. |
|   } | — | — |
|   MBS DIUC | 4 | — |
|   OFDMA Symbol Offset | 8 | OFDMA symbol offset with respect to start of next (MBS Burst Frame offset + 2)th frame. |
|   Subchannel Offset | 6 | OFDMA subchannel offset with respect to start of the next (MBS Burst Frame offset + 2)th frame. |
|   Boosting | 3 | Refer to Table 321. |
|   No. OFDMA Symbols | 7 | The size of MBS data. |
|   No. Subchannels | 6 | — |
|   Repetition Coding Indication | 2 | 0b00—No repetition coding<br>0b01—Repetition coding of 2 used<br>0b10—Repetition coding of 4 used<br>0b11—Repetition coding of 6 used |
|   Next MBS Frame Offset | 8 | A relative value from the current frame number in which the next MBS MAP message will be transmitted. |
|   Next MBS OFDMA Symbol Offset | 8 | The offset of the OFDMA symbol in which the next MBS portion starts, measured in OFDMA symbols from the beginning of the DL frame in which the MBS_MAP is transmitted. |
|   if (Next MBS MAP change indication == 1){ | — | — |

TABLE 3-continued

| Syntax | Size (bit) | Notes |
|---|---|---|
| Next MBS No. OFDMA Symbols | 6 | It is to indicate the size of MBS_MAP message in Next MBS portion where the BS shall transmit the next MBS frame for multicast CIDs in this IE. |
| Next MBS No. OFDMA Subchannels | 6 | It is to indicate the size of MBS_MAP message in Next MBS portion where the BS shall transmit the next MBS frame for multicast CIDs in this IE. |
| } | — | — |
| } | — | — |

In Table 3, the MBS_DATA_IE message includes resource allocation information about MBS bursts and information on a location to which the next MBS_MAP message will be transmitted.

Figure 2:
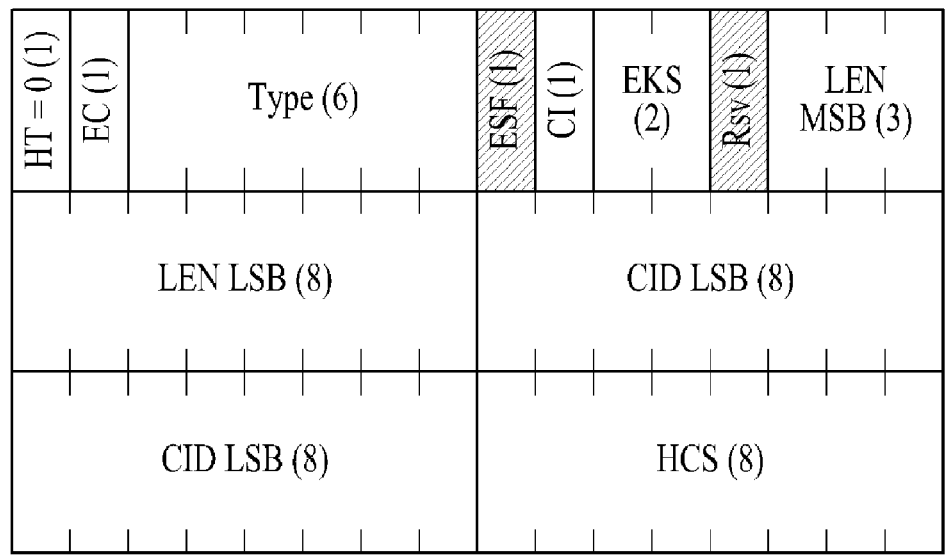
FIG. 2 shows a generic MAC header (GMH) structure in an IEEE 802.16e system.

FIG. 2 shows a structure of a general medium access control (MAC) header (GMH) in IEEE 802.16e systems.

Referring to FIG. 2, the GMH includes CID information having a total of 16 bits consisting of 8 CID most significant bits (MBSs) and 8 CID least significant bits (LSBs).

A description will be given of multicast operation of the M2M application in an IEEE 802.16p system. The IEEE 802.16p system supports multicast operation for M2M devices. Especially, it supports M2M multicast operation in an idle mode.

A BS can provide a multicast service for an M2M device in an idle mode by requiring network reentry of the M2M device or without requiring it. Prior to downlink multicast data transmission, the BS may transmit a paging message including a multicast traffic instruction to the M2M device during a paging listening interval of the M2M device. If the M2M device receives a paging message that directs multicast traffic reception in the paging listening interval without network reentry, the M2M device starts to receive downlink multicast data without ending the idle mode.

Multicast transmission start time TLV may be included in a paging message in order to indicate when downlink multicast data is transmitted by the BS. A value of the multicast transmission start time TLV is less than the next paging listening interval start time of a device that receives the paging message (e.g. MOB_PAG-ADV message). The M2M device may power down until a frame indicated by the multicast transmission start time TLV in the MOB_PAG_ADV message.

An M2M group ID (MGID) uniquely identifies an M2M group in the domain of a network entity which allocates an MGID to a group to which one or more M2M devices belong. The MGID is used to identify a device group (e.g. in the case of group paging). The MGID is assigned to M2M devices in the event of initial network entry and explicit network exit (e.g. when power down point is updated). If an M2M device does not exit a network, an MGID allocated to the M2M device is maintained by the M2M device even in an idle state. The MGID may be reallocated. The MGID may be added or changed through dynamic service addition (DSA) and DSC procedures in a connected mode.

As described above, in the conventional MBS, a multicast CID represents a multicast service flow, is used for a multicast burst in MBS MAP during multicast data transmission, and is included in the CID field of the MAC header of a multicast MPDU to indicate a multicast flow. In addition, the multicast CID is assigned by a network entity (e.g. an MBS DPF/MBS proxy) which controls MBS zones and is unique in the MBS zones. Accordingly, if an MS receives a multicast CID belonging to the corresponding MBS zone and then exits the MBS zone, the MS needs to perform a procedure of updating the multicast CID.

A 15-bit MGID used to indicate group control and a multicast service flow in the IEEE 802.16p system may be assigned to M2M devices through a DSA procedure and mapped to corresponding multicast service flow parameters. The MGID indicates one M2M group in a network entity domain and may be discriminated and used in a specific MGID zone.

In this scenario, the BS needs to embed an ID corresponding to a multicast burst into the multicast burst such that M2M devices properly decode the multicast burst, when transmitting control information (e.g. MAP) for multicast data transmission. In a conventional multicast system, a multicast CID is inserted in MBS MAP. However, multicast CIDs cannot represent all 15-bit MGIDs because the number of multicast CIDs is limited to 95. To solve this problem, instead of a multicast CID, an MGID allocated during a DSA procedure is embedded in a MAP IE that transmits M2M multicast data such that M2M devices corresponding to the MGID can properly receive the M2M multicast data. However, this requires the M2M devices to additionally execute a function of parsing MAP using the MGID instead of CID when performing MAP decoding for downlink burst allocation.

Accordingly, the present invention proposes a method of using an MGID and a CID for multicast data transmission. As described above, multicast CIDs cannot replace MGIDs because of lack of multicast CID space. When multicast connection including an MGID is established, the BS assigns one CID mapped to the MGID in a CID space (2m+1~0xFE9F) used for transport CIDs. The CID is unique in the BS because it is assigned by the BS. That is, a different M2M multicast CID can be allocated for the same MGID in a different BS.

The following table 4 shows another example of the CID range.

TABLE 4

| CID | Value | Description |
|---|---|---|
| Ranging CID | 0x0000 | Used by SS and BS during initial ranging process. |
| Basic or RS basic | 0x0001-m | The same value is assigned to both the DL and UL connection. |
| Primary Management or RS primary management | m + 1-2m | The same value is assigned to both the DL and UL connection. |
| Transport, Secondary Management, Tunnel or Management | 2m + 1-0xFE9F | For the secondary management connection, the same value is assigned to both the DL and UL connection. Tunnel CID is used for tunnel transport |

TABLE 4-continued

| CID | Value | Description |
|---|---|---|
| Tunnel, Multicast management CID, M2M multicast CIDs | | connections. Management Tunnel CID is used for tunnel management connections. Multicast management CID is used for downlink multicast management services. M2M multicast CID is used for multicast service for M2M applications. |
| Multicast CIDs | 0xFEA0-0xFEFE | For the DL multicast service, the same value is assigned to all MSs on the same channel that participate in this connection. |
| AAS Initial Ranging | 0xFEFF | A BS supporting AAS shall use this CID when allocating an AAS ranging period (using AAS Ranging Allocation IE). |
| ... | ... | ... |

Table 4 shows an example of definition of the CID space used for the transport CIDs such that the CID space can be used for M2M multicast transmission. In this case, an M2M multicast CID will be included in a MAP IE for multicast burst transmission.

Figure 3:
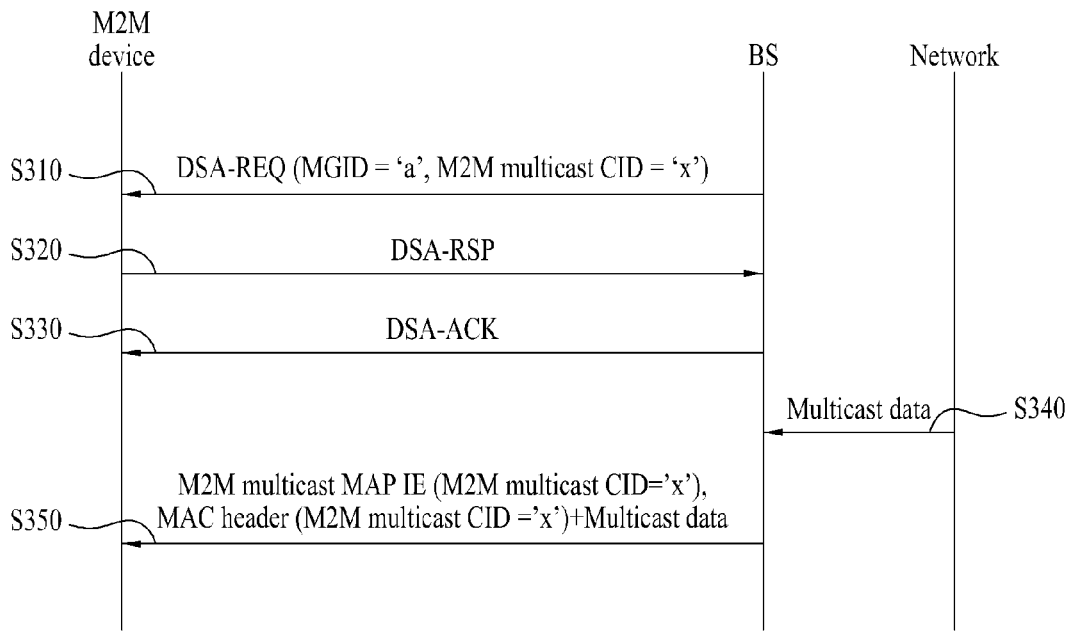
FIG. 3 is a flowchart illustrating an exemplary procedure through which an M2M device is allocated a multicast CID.

FIG. 3 is a flowchart illustrating an exemplary procedure which an M2M device is allocated a multicast CID.

Referring to FIG. 3, the M2M device may receive a DSA-REQ (or AAI-DSA-REQ) message from a BS (S310). The DSA-REQ (Dynamic Service Addition)/AAI-DSA-REQ message may contain MGID information (e.g. MGID=a) and M2M multicast CID information (M2M multicast CID='x'). The M2M device may transmit a DSA-RSP/AAI-DSA-RSP message to the BS as a response to the DSA-REQ/AAI-DSA-REQ message (S320) and may receive a DSA-ACK/AAI-DSA/ACK message from the BS (S330).

The BS may receive multicast data from a network (S340) and transmit, to the M2M device, a multicast MAP (or A-MAP) IE message and the multicast data received from the network (S350). The M2M multicast MAP IE ((or M2M multicast A-MAP) message transmitted to the M2M device may contain M2M multicast CID information (M2M multicast CID='x') and the MAC header of the multicast data may also include multicast CID information (M2M multicast CID='x'). That is, the M2M multicast CID allocated during a DSA procedure may be included in the MAP IE and transmitted when the multicast data is transmitted to the M2M device. The processor 120 of the M2M device can determine that the multicast data including the same M2M multicast CID information as M2M multicast CID='x' allocated during the DSA procedure corresponds to the M2M device.

Figure 4:
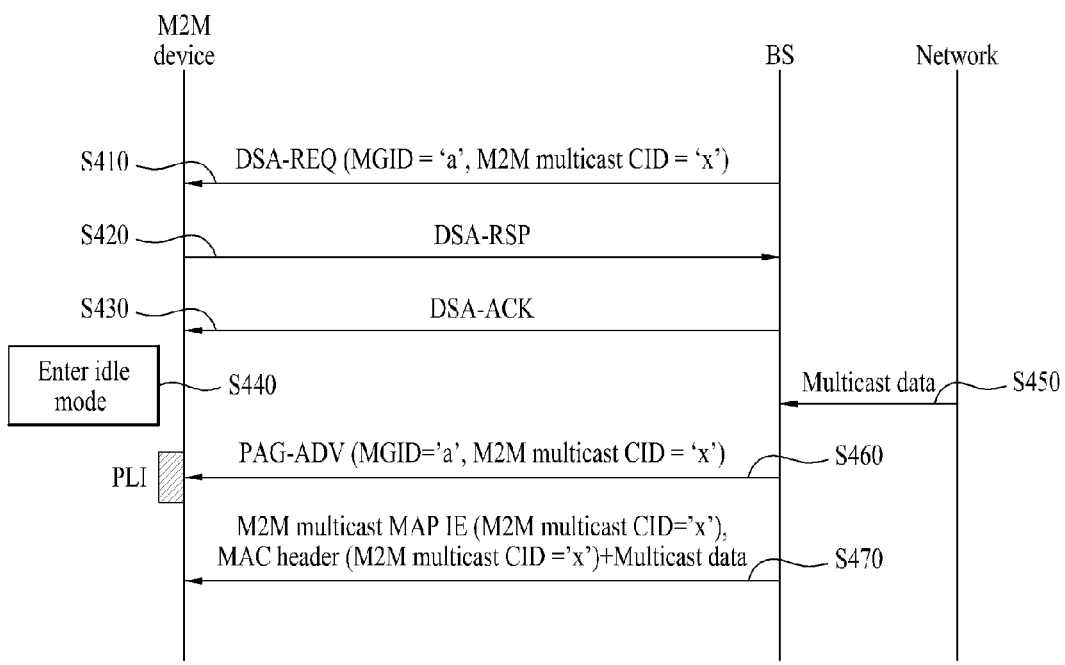
FIG. 4 is a flowchart illustrating another exemplary procedure through which an M2M device is allocated a multicast CID.

FIG. 4 is a flowchart illustrating another exemplary procedure in which an M2M device is allocated a multicast CID.

Referring to FIG. 4, the M2M device may receive a DSA-REQ (or AAI-DSA-REQ) message from a BS (S410). The DSA-REQ/AAI-DSA-REQ message may contain MGID information (e.g. MGID=a) and M2M multicast CID information (M2M multicast CID='x'). The M2M device may transmit a DSA-RSP/AAI-DSA-RSP message to the BS as a response to the DSA-REQ/AAI-DSA-REQ message (S420) and may receive a DSA-ACK/AAI-DSA/ACK message from the BS (S430).

Then, the M2M device may enter an idle mode (S440). The BS may receive multicast data from a network (S450). Upon reception of the multicast data from the network, the BS may transmit a paging message PAG-ADV/AAI-PAG-ADV to the M2M device (S460). The paging message may include MGID information (e.g. MGID=a) and M2M multicast CID information (M2M multicast CID='x').

The BS may transmit, to the M2M device, an M2M multicast MAP (or A-MAP) IE message and the multicast data received from the network (S470). The M2M multicast MAP (or A-MAP) IE message transmitted to the M2M device may contain M2M multicast CID information (M2M multicast CID='x') and the MAC header of the multicast data may also include multicast CID information (M2M multicast CID='x'). That is, the M2M multicast CID allocated during a DSA procedure can be used to inform the M2M device in the idle mode of presence of multicast traffic through the paging message.

The processor 120 of the M2M device can receive the paging message including the M2M multicast CID information corresponding (or identical) to M2M multicast CID='x' allocated during the DSA procedure and confirm presence of multicast traffic corresponding to the M2M device.

The following table 5 shows an exemplary M2M multicast allocation IE/M2M multicast allocation A-MAP IE message format in the case of FIG. 4.

TABLE 5

| Syntax | Size (bit) | Notes |
|---|---|---|
| M2M Multicast Assignment IE( ){ | — | — |
| Extended-2 DIUC | 4 | M2M Multicast Assignment IE ( ) = 0xF (Extended-3 DIUC) |
| Length | 8 | Length in bytes |
| Extended-3 DIUC | 4 | 0x01 |
| M2M multicast CID | 16 | |
| DIUC | 4 | |
| OFDMA Symbol Offset | 8 | The offset of the OFDMA symbol measured in OFDMA symbols from beginning of the DL frame in which the DL-MAP is transmitted. Counting from the frame preamble and starting from 0 |
| Subchannel offset | 7 | The offset of the first OFDMA symbol of the MBS region measured in OFDMA symbols from beginning of this DL frame |
| No. Subchannels | 7 | |
| No. OFDMA symbols | 7 | |
| Repetition Coding Indication | 2 | 0b00—No repetition coding 0b01—Repetition coding of 2 used 0b10—Repeition coding of 4 used 0b11—Repetition coding of 6 used |
| if!(byte boundary) { | | |
| Padding nibble | variable | Padding to reach byte boundary |
| } } | — | |

On the assumption that an M2M multicast CID is mapped one-to-one to one multicast service flow (i.e. MGID), if the BS supports numerous multicast service flows (or MGIDs), there will be many M2M multicast CIDs used for the M2M multicast service, which may reduce the number of transport CIDs of M2M devices.

Therefore, one M2M multicast CID may be assigned to one or more multicast service flows. That is, one M2M multicast CID may be mapped to one or more MGIDs. In this case, if the M2M multicast CID is used for a MAP IE and a generic MAC header, the processor 120 of the M2M device decodes data with respect to a multicast service flow that is not assigned to the M2M device and controls the decoded data to be delivered to an upper layer. That is, the M2M device receives incorrect multicast data. To solve this problem, the following method can be considered.

<First Method of Identifying Multicast Data on MAC Layer>

Figure 5A:
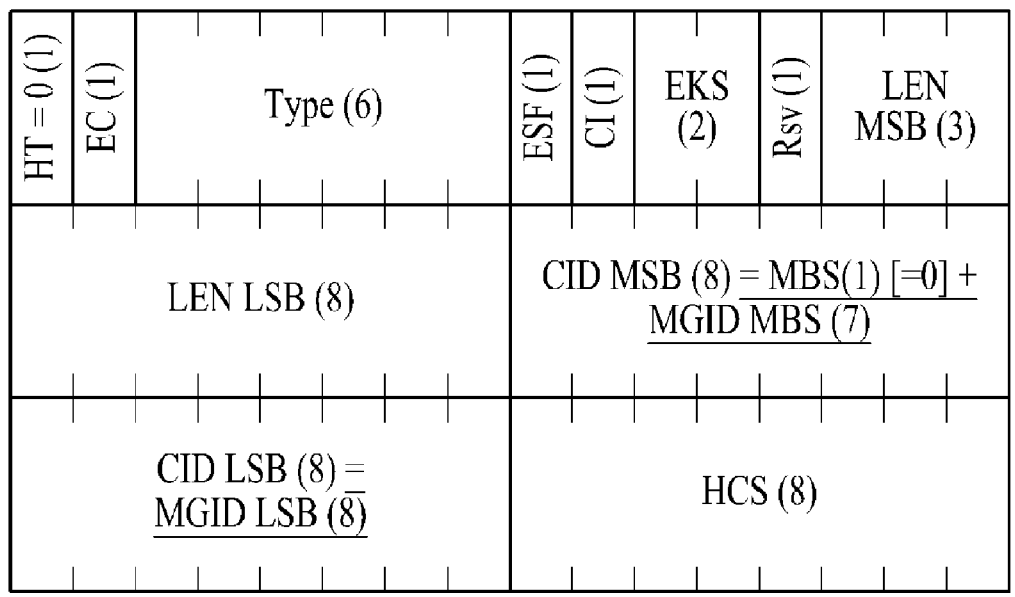
FIG. 5A illustrates an example of using 15 bits of a CID other than the MSB thereof as an MGID when the MSB of the CID is padded with 0.
Figure 5B:
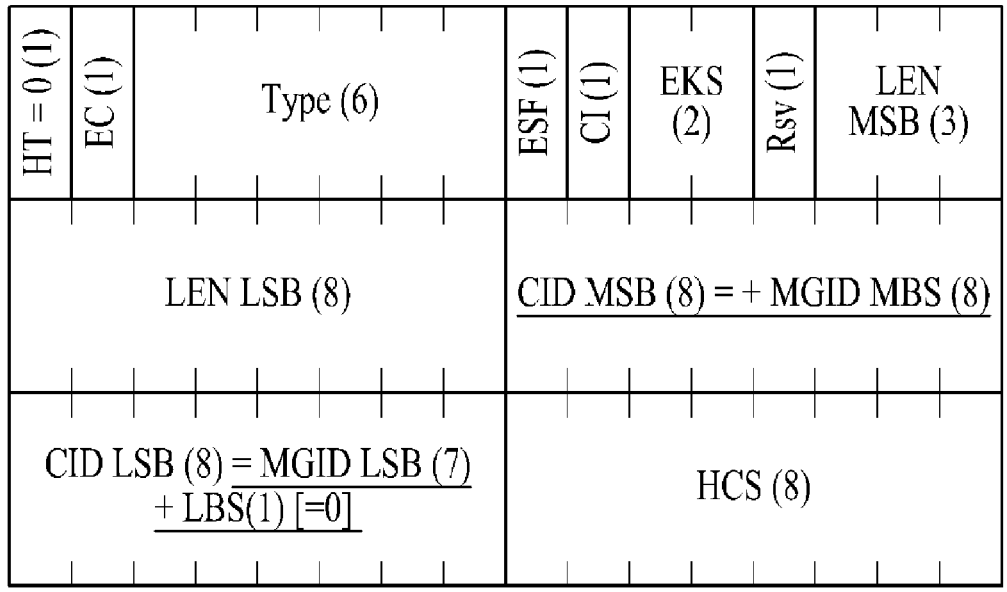
FIG. 5B illustrates an example of using 15 bits of a CID other than the LSB thereof as an MGID when the LSB of the CID is padded with 0.

A CID field uses an MGID instead of an M2M multicast CID. In this case, one LSB or one MSB is padded with 1 or 0 because the MGID is 15 bits or 12 bits. That is, the processor 120 of the M2M device can identify an M2M multicast burst using an M2M multicast CID included in a MAP IE and check the MGID included in the CID field of the MAC header in a medium access control packet data unit (MAC PDU) to determine whether the corresponding multicast service flow is for the M2M device. FIG. 5A shows an example of using 15 bits of a CID other than one MSB thereof as an MGID when the one MSB is padded with 0, and FIG. 5B shows an example of using 15 bits of a CID other than one LSB thereof as an MGID when the one MSB is padded with 0. If the MSB and LSB are determined to be padded with 1, each padded bit is set to 1.

<Second Method of Identifying Multicast Data on MAC Layer>

The BS can transmit an MGID to the M2M device through a subheader or an extended subheader. In this case, the CID field uses the M2M multicast CID. In a GMH, the sixth bit (i.e. #5, MSB) of a 6-bit type field is reserved and this bit can be used to indicate presence or absence of an M2M multicast subheader including an MGID. That is, if the sixth bit is set to 1, an M2M multicast subheader including an MGID, as shown in the following table 6, will be included in a MAC PDU. Table 6 shows an exemplary M2M multicast subheader.

TABLE 6

| Syntax | Size(bits) | Notes |
|---|---|---|
| M2M multicast subheader { | | |
| MGID | 15 | |
| Reserved | 1 | |
| } | | |

The following table 7 shows an exemplary type field encoding format.

TABLE 7

| Type bit | Value |
|---|---|
| #5 MSB | M2M multicast subheader<br>1 = present invention<br>0 = absent |
| #4 | ARQ feedback payload<br>1 = present invention 0 = absent |
| #3 | Extended type<br>Indicates whether the present packing subheader (PSH) or fragmentation subheader (FSH) is extended for non-ARQ-enabled connections<br>1 = Extended<br>0 = Not extended<br>For ARQ-enabled connections, this bit shall be set to 1. |
| . . . | |
| #0 LSB | DL: Fast-feedback allocation subheader (FFSH)<br>UL: Grant management subheader (GMSH)<br>1 = present invention<br>0 = absent |

In Table 7, the sixth bit (i.e. #5, MSB) of a 6-bit type field in a GMH is reserved and this bit can be used to indicate presence or absence of an M2M multicast subheader including an MGID. That is, if the sixth bit is set to 1, an M2M multicast subheader is included in a MAC PDU.

Figure 6:
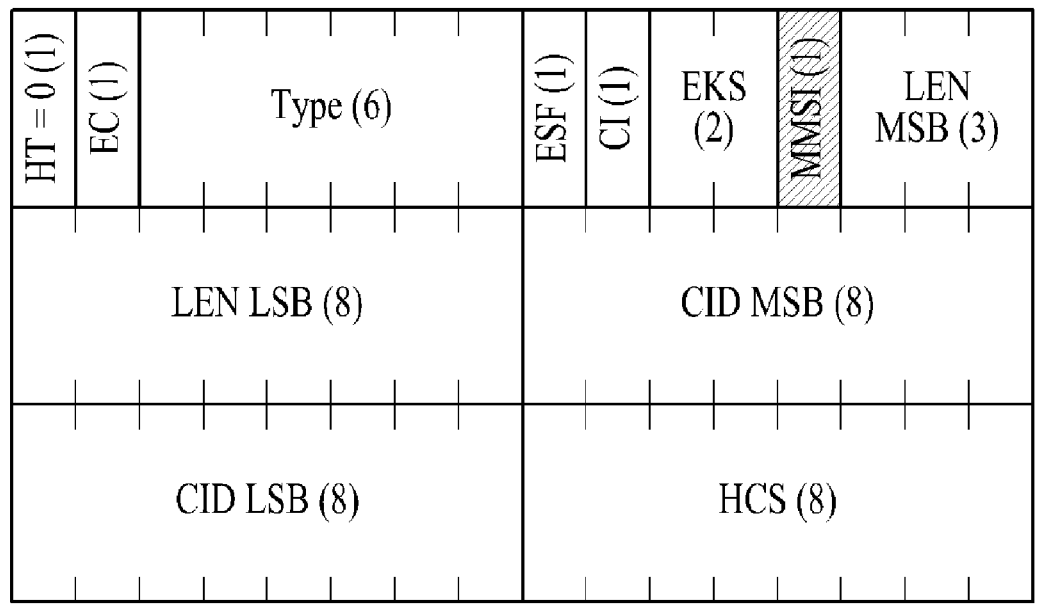
FIG. 6 shows a GMH structure according to Table 8.

The following table 8 shows an exemplary M2M multicast MPDU and FIG. 6 shows a GMH structure according to Table 8.

TABLE 8

GMH [MMSI = 1]
M2M multicast subheader [MGID = 'a']
Multicast payload

In Table 8, instead of a reserved bit (MSB) of the type field, a reserved bit (i.e. a bit following the EKS field) of the GMH can be used as an M2M multicast subheader indicator (MMSI). That is, when this field is set to 1, it indicates presence of the M2M multicast subheader.

The following table 9 shows another exemplary M2M multicast MPDU.

TABLE 9

GMH [MMSI = 1]
M2M multicast subheader [MGID = 'a']
Multicast payload

The MMSI can be replaced by other indicators. That is, the present invention can indicate presence of a subheader including an MGID using part of bits of the GMH instead of the MMSI or type field and embed the subheader (e.g. M2M multicast subheader) including the MGID in an MPDU when indication is set to 'on'. The MGID can be transmitted through not only a new subheader (M2M multicast subheader) but also an existing subheader or an extended subheader.

As a method of indicating presence of an M2M multicast subheader including an MGID without using the above indicator, the processor 120 of the M2M device can check a CID to indicate presence of the M2M multicast subheader. Specifically, the processor 120 of the M2M device can check the CID of the corresponding GMH and, if the CID corresponds to a CID indicating M2M multicast connection including an MGID, confirm that the M2M multicast subheader including an MGID is present. That is, the processor 120 of the M2M device can check presence or absence of the subheader through the CID.

The following table 10 shows another exemplary M2M multicast MPDU.

TABLE 10

GMH [CID is for M2M multicast]
M2M multicast subheader [MGID = 'a']
Multicast payload If the MGID is transmitted through an extended subheader, the ESF bit will be set to 1. Here, the MGID extended subheader format (M2M multicast extended subheader format) may be as shown in the following table 11.

TABLE 11

| Name | Size (bits) | Description |
|---|---|---|
| MGID | 15 | |
| Reserved | 1 | |

In this case, one reserved value of a downlink extended subheader type is used to indicate the MGID extended subheader. The following table 12 explains the extended subheader type.

TABLE 12

| Type | Name | Extended subheader body size (byte) | Description |
|---|---|---|---|
| 1 | SDU_SN extended subheader | | |
| 2 | DL sleep control extended subheader | | |
| ... | | | |
| 5 | PDU SN(long) extended subheader | | |
| 6 | M2M multicast extended subheader | 2 | |
| 7~127 | | 1 | |

In Table 12, extended subheader type 6 indicates an M2M multicast extended subheader.

If one MPDU includes multiple multicast data pieces which belong to different MGIDs, the MPDU needs to include one or more MGIDs. A method for transmitting multicast data when one or more MGIDs are included in the MPDU will now be described.

<First Method of Transmitting Multicast Data when One MPDU Includes a Plurality of Multicast Data Pieces Belonging to One or More MGIDs>

This method uses concatenation. Specifically, a multicast service data unit (SDU) for each MGID is configured as one MPDU, and then MPDUs corresponding to respective MGIDs are concatenated and transmitted. That is, each MPDU includes a MAC header. Here, one MGID is included in each MPDU using the above-mentioned methods. The CID field uses an MGID instead of an M2M multicast CID.

The processor 120 of the M2M device can identify an M2M multicast burst using an M2M multicast CID included in a MAP IE and determine whether the corresponding multicast service flow is for the M2M device by checking the MGID included in the CID field of the MAC header in a MAC PDU. This method can be represented by the following table 13.

TABLE 13

MPDU for MGID = '1'
  GMH [CID is mapped to MGID = '1']
  Multicast SDU for MGID = '1'

MPDU for MGID = '2'
  GMH [CID is mapped to MGID = '2']
  Multicast SDU for MGID = '2'

Referring to Table 13, when one MPDU includes a plurality of multicast data pieces belonging to different MGIDs, a multicast SDU for each MGID is configured as one MPDU, and then MPDUs corresponding to respective MGIDs are concatenated and transmitted.

The following table 14 shows a case in which an MGID is transmitted in a sub-form.

TABLE 14

MPDU for MGID = '1'
  GMH [CID for M2M multicast]
  M2M multicast subheader [MGID = '1']
  Multicast SDU for MGID = '1'

MPDU for MGID = '2'
  GMH [CID for M2M multicast]
  M2M multicast subheader [MGID = '2']
  Multicast SDU for MGID = '2'

In this case, transmission of the MGID in a subform can be indicated using the above-mentioned method, that is, using the MSB of the type field or MMSI, or checking whether a CID is an M2M multicast CID. While indication of transmission of the MGID uses the method of checking whether a CID is an M2M multicast CID in the example of table 14, the MSB of the type field or MMSI is applicable. The following table 15 shows a case of using the M2M multicast extended subheader.

TABLE 15

MPDU for MGID = '1'
  GMH [CID for M2M multicast, ESF = 1]
  M2M multicast extended subheader [MGID = '1']
  Multicast SDU for MGID = '1'

MPDU for MGID = '2'
  GMH [CID for M2M multicast, ESF = 1]
  M2M multicast extended subheader [MGID = '2']
  Multicast SDU for MGID = '2'

As shown in Table 15, the M2M multicast extended subheader including an MGID may be used.

<Second Method of Transmitting Multicast Data when One MPDU Includes a Plurality of Multicast Data Pieces Belonging to One or More MGIDs>

An extension flag is defined in a subheader including an MGID to indicate whether a subheader including a different MGID follows the subheader. When the M2M multicast subheader is used, it is possible to indicate whether another M2M multicast subheader is present using a reserved bit in the M2M multicast subheader.

The following table 16 shows an exemplary M2M multicast subheader format including an extension flag field.

TABLE 16

| Syntax | Size(bits) | Notes |
|---|---|---|
| M2M multicast subheader { | | |
| MGID | 15 | |
| Extension flag | 1 | 0: Indicates that this subheader is the last subheader of M2M multicast subheaders<br>1: Indicates that another M2M multicast subheader follows |
| } | | |

In Table 16, the extension flag indicates that this subheader is the last subheader of M2M multicast subheaders when set to 0 and indicates that another M2M multicast subheader follows when set to 1, or vice versa.

The following table 17 shows an exemplary subheader format using the extension flag.

TABLE 17

| |
|---|
| GMH [MSB bit of Type field = 1] |
| M2M multicast subheader [MGID = 'a', extension flag = 1] |
| M2M multicast subheader [MGID = 'b', extension flag = 0] |
| Multicast payload for MGID = a |
| Multicast payload for MGID = b |

In Table 17, the MSB of the type field indicates presence of a subheader including an MGID. The MSB of the type field can be replaced by the MMSI, as described above. Otherwise, when a CID indicates the M2M multicast service, instead of the MMSI, the M2M multicast subheader can be included. In the example of Table 17, two multicast payloads are included, which represents that two MGIDs are included in the subheader.

<Third Method of Transmitting Multicast Data when One MPDU Includes a Plurality of Multicast Data Pieces Belonging to One or More MGIDs>

According to this method, a subheader indicating the number of MGIDs (MGID number subheader) is defined and as many MGIDs as the number indicated by the subheader are included in a subheader or subheaders including MGIDs successively follow the MGID number subheader. The MSB of the type field or MMSI can indicate presence or absence of the MGID number subheader. The following table 18 shows an example of the MGID number subheader.

TABLE 18

| Syntax | Size (bits) | Notes |
|---|---|---|
| MGID Number subheader { | | |
| Number of MGID | 8 | |
| } | | |

As many MGID subheaders as the number indicated by the MGID number subheader follow the MGID number subheader.

The following table 19 shows an example of indicating presence or absence of a subheader using the MSB of the type field.

TABLE 19

| |
|---|
| GMH [MSB bit of Type field = 1] |
| MGID number subheader [Number = 2] |
| M2M multicast subheader [MGID = 'a', extension flag = 1] |
| M2M multicast subheader [MGID = 'b', extension flag = 0] |
| Multicast payload for MGID = a |
| Multicast payload for MGID = b |

The following table 20 shows an exemplary subheader including information on the number of MGIDs and an MGID. In this case, a length field is at the head of the subheader.

TABLE 20

| Syntax | Size (bits) | Notes |
|---|---|---|
| M2M multicast subheader { | | |
| Length | 4 | |
| Number of MGID | 4 | |
| For (i=0;i<Number of MGID; i++) | | |
| MGID | | |
| Padding | Variable | Byte alignment |
| } | | |

This subheader can be indicated using the MSB of the type field, MMSI and M2M multicast CID, as described above.

When a CID indicates the M2M multicast service as in the above example, the subheader includes an MGID number subheader, and as many M2M multicast subheaders as the number indicated by the MGID number subheader can follow the MGID number subheader. One or more MGIDs can be transmitted using an M2M multicast subheader including an extension field, which is shown in Table 21.

TABLE 21

| | |
|---|---|
| GMH [CID is for M2M multicast] | GMH [CID is for M2M multicast] |
| M2M multicast subheader [MGID = 'a', extension flag = 1] | MGID number subheader [Number = 2] |
| M2M multicast subheader [MGID = 'b', extension flag = 0] | M2M multicast subheader [MGID = 'a', extension flag = 1] |
| Multicast payload for MGID = a | M2M multicast subheader [MGID = 'b', extension flag = 0] |
| Multicast payload for MGID = b | Multicast payload for MGID = a |
| | Multicast payload for MGID = b |

<Fourth Method of Transmitting Multicast Data when One MPDU Includes a Plurality of Multicast Data Pieces Belonging to One or More MGIDs>

This method uses an extended subheader. In this case, the extension flag or MGID number defined in the subheader can be used. An extended subheader including as many types as the number of extended headers containing MGIDs may be present, as shown in Table 22.

TABLE 22

| | | |
|---|---|---|
| GMH [CID is for M2M multicast] | | |
| Extended header group length | | |
| rsv | Type- M2M multicast | |
| M2M multicast extended subheader [MGID = 'a'] | | Extended subheader |
| rsv | Type = M2M multicast | |
| M2M multicast extended subheader [MGID = 'b'] | | |
| Multicast payload for MGID = a | | |
| Multicast payload for MGID = b | | |

A plurality of MGIDs may be included in one extended subheader by defining an extension flag or a field indicating the number of MGIDs. The following table 23 shows an exemplary extended subheader (M2M multicast extended subheader) including an extension flag.

TABLE 23

| Name | Size (bits) | Description |
| --- | --- | --- |
| MGID | 15 | |
| Extension flag | 1 | |
| Reserved | 1 | |

The following table 24 shows an exemplary extended subheader (M2M multicast extended subheader) including the number of MGIDs.

TABLE 24

| Name | Size (bits) | Description |
| --- | --- | --- |
| Length | 4 | |
| Number of MGID | 4 | |
| For (i=0; i<Number of MGID;i++) | | |
| MGID | 15 | |
| Reserved | Variable | Byte alignment |

In addition, the above-mentioned methods of defining a subheader can be applied to the extended subheader.

<Fifth Method of Transmitting Multicast Data when One MPDU Includes a Plurality of Multicast Data Pieces Belonging to One or More MGIDs>

This method uses a packing subheader (PSH). The BS can transmit multicast data (SDU) for different MGIDs in a packing form. That is, the BS can transmit SDUs belonging to different MGIDs using a packing subheader. If a CID corresponds to a CID indicating M2M multicast connection and no packing subheader is present, a subheader (M2M multicast subheader) including an MGID follows the last subheader. If the CID corresponds to the CID indicating M2M multicast connection and a packing subheader is present, a subheader (M2M multicast subheader) including an MGID follows the packing subheader. That is, a subheader including as many MGIDs as the number of packing subheaders can be present. Table 25 shows an exemplary subheader including an MGID, which follows a packing subheader or the last subheader and Table 26 shows an exemplary multicast MPDU for explaining the subheader.

TABLE 25

| Syntax | Size (bits) | Notes |
| --- | --- | --- |
| M2M multicast subheader { | | |
| MGID | 15 | |
| Reserved | 1 | |
| } | | |

TABLE 26

| |
| --- |
| GMH [CID for M2M multicast, Type field = 0b000010] |
| PSH [Length = a + PSH_LEN + MMSH_LEN] |
| M2M multicast subheader [MGID = '1'] |
| Multicast SDU for MGID = '1' |
| Length = 'a' |
| PSH [Length = b + PSH_LEN + MMSH_LEN] |
| M2M multicast subheader [MGID = '2'] |
| Multicast SDU for MGID = '2' |
| Length = 'b' |

In Table 26, multicast SDUs for two different MGIDs (MGID='1' and MGID='2') are included in one MPDU and respectively include PSH headers. In the above example, it is determined whether an M2M multicast subheader is included as an M2M multicast CID. Alternatively, it is possible to determine whether the M2M multicast subheader is included as the M2M multicast CID using the above-mentioned MMSI or MSB of the type field and to define the M2M multicast subheader similarly to the above example. Otherwise, it is possible to extend the M2M multicast subheader in an extended subheader.

A subheader containing an MGID may include PDU length information about the MGID or SDU SN. This can prevent redundant and unnecessary use of a packing subheader. That is, a subheader including an MGID while having a packeting subheader function can be defined. The following tables 27, 28 and 29 show exemplary M2M multicast subheader formats.

TABLE 27

| Syntax | Size (bits) | Notes |
| --- | --- | --- |
| M2M multicast subheader { | | |
| Length | 4 | Length of M2M multicast subheader |
| MGID | 15 | |
| Length of Multicast data | 11 | Length of multicast data (SDU) for corresponding MGID |
| SDU sequence number | 10 | |
| Reserved | 2 | |
| } | | |

TABLE 28

| Syntax | Size (bits) | Notes |
| --- | --- | --- |
| M2M multicast subheader { | | |
| Length | 4 | Length of M2M multicast subheader |
| MGID | 15 | |
| Length of Multicast data | 11 | Length of multicast data (SDU) for corresponding MGID |
| SDU sequence number | 10 | |
| Extension flag | 1 | |
| Reserved | 1 | |
| } | | |

TABLE 29

| Syntax | Size (bits) | Notes |
| --- | --- | --- |
| M2M multicast subheader { | | |
| Length | 4 | Length of M2M multicast subheader |
| Number of MPDU | 4 | |
| For (i=0; i<Number of MPDU;i++) | | |
| MGID | 15 | |
| Length of Multicast data | 11 | Length of multicast data (SDU) for corresponding MGID |
| SDU sequence number | 10 | |
| } | | |
| Padding | Variable | Byte alignment |
| } | | |

When an MGID is assigned through a DSA procedure, the MGID can replace a CID even in a MAC header if the CID is not allocated. In this case, the MGID can be included in the MAC header as described below.

The CID field uses the MGID instead of the M2M multicast CID. In this case, one LSB or one MSB of the CID field is padded with 1 or 0 because the MGID is 15 bits (or 12 bits).

Figure 7A:
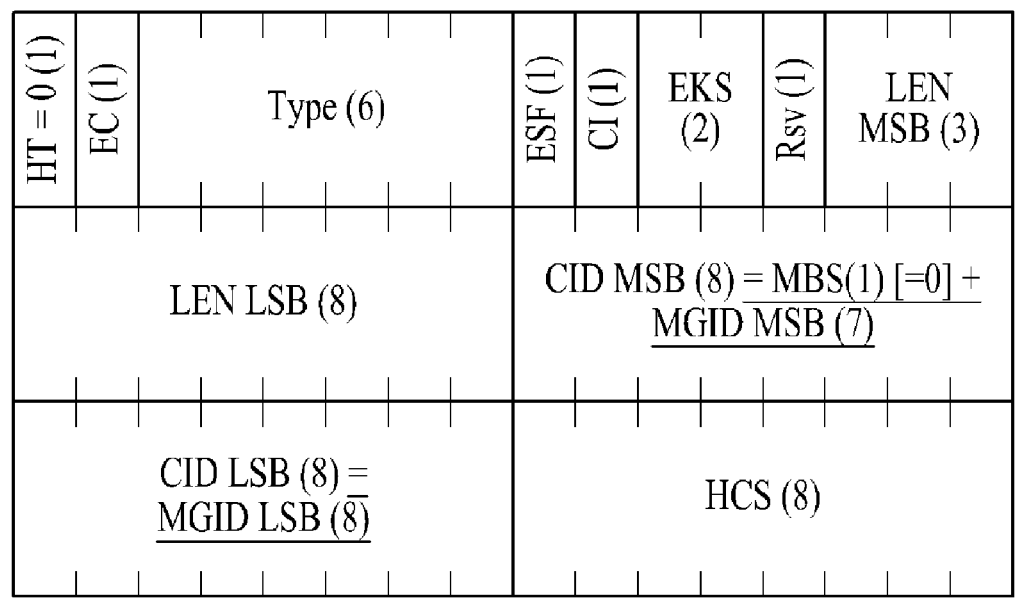
FIG. 7A illustrates an example of using 15 bits of a CID other than the MSB thereof as an MGID when the MSB of the CID is padded with 0.
Figure 7B:
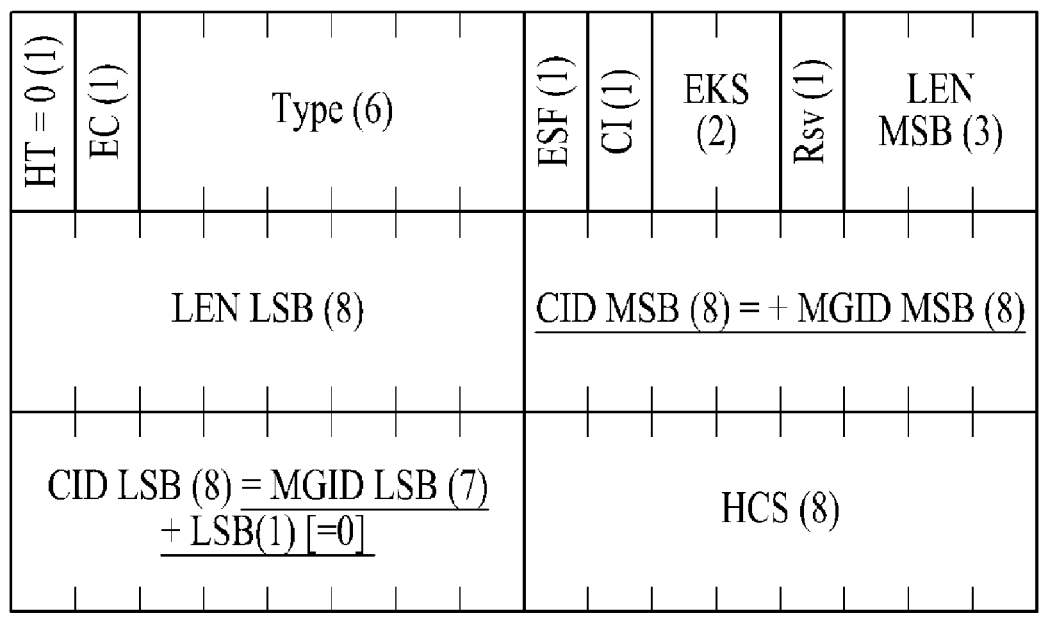
FIG. 7B illustrates an example of using 15 bits of a CID other than the LSB thereof as an MGID when the LSB of the CID is padded with 0.

That is, the processor 120 of the M2M device can identify an M2M multicast burst using an M2M multicast CID included in a MAP IE and check the MGID included in the CID field of the MAC header in a MAC PDU to determine whether the corresponding multicast service flow is for the M2M device. FIG. 7A shows an example of using 15 bits of a CID other than one MSB thereof as an MGID when the one MSB is padded with 0, and FIG. 7B shows an example of using 15 bits of a CID other than one LSB thereof as an MGID when the one MSB is padded with 0.

Bit #5 (MSB) of the type field or Rsv(1) may be used as an indicator for indicating use of the MGID instead of the CID. That is, the CID field uses the MGID instead of the CID when the indicator set to 1.

Instead of the MGID, a CID assigned during the DSA procedure may be included in control information (e.g. MAP) for multicast data transmission. In this case, since the CID indicates multicast data, the processor 120 of the M2M device having multicast service connection needs to decode all multicast bursts transmitted through the MAP IE including the CID.

After decoding the multicast bursts, the processor 120 of the M2M device may determine whether multicast data transmitted thereto is destined for the M2M device by checking the MGID included in the MPDU. The processor 120 of the M2M device controls the multicast data to be transmitted to an upper layer when the multicast data is destined for the M2M device and discards the multicast data when it is not. An MGID is embedded into a MAC header using a method of inserting an MGID into a CID field using an indicator or without using an indicator (i.e. a method of padding 1 bit), or a method of embedding an MGID in a subheader and transmitting the subheader to the M2M device, as described above.

When an MGID is included in a subheader, the MGID may be inserted in an existing subheader or a new subheader may be defined. When the new subheader is defined, it is possible to indicate presence of the subheader using bit #5 (MSB) of the type field or Rsv(1), as described above. When a CID is included in a MAP, it is not necessary to define a new MAP IE for multicast transmission because the existing downlink MAP IE can be reused.

<CID Update Procedure for M2M Multicast Service>

In IEEE 802.16e systems, data transmission/reception is performed between a BS and an MS on the basis of a CID assigned to the MS when the MS enters a network or a service flow is generated. That is, when a MAP IE that assigns resources is transmitted for data transmission/reception, a CID is included in the MAP IE or included in a MAC header of a MPDU of data so as to indicate a service flow corresponding to the data.

Even in IEEE 802.16p systems to which M2M communication is applied, it is necessary to use a CID for data transmission/reception and M2M multicast service transmission. For this, the BS can assign a CID for multicast connection when establishing connection to an M2M device for the M2M multicast service using a DSA procedure. The assigned CID is used to identify the multicast connection within a cell (or BS). In this case, the BS can assign one CID from a CID space (2 m+1~0xFE9F) which allocates transport CIDs to the M2M device. Otherwise, the BS can assign one M2M multicast CID from a CID space (0xFEA0~0xFEFE) that allocates M2M multicast CIDs instead of transport CIDs to the M2M device.

The assigned CID is connected to a multicast service flow relating to an MGID and the assigned M2M multicast CID may be included in a multicast MAP IE for transmitting multicast bursts.

When the M2M device is moved to a BS within a specific zone which manages MGIDs (e.g. an M2M device group zone in the IEEE 802.16p system), the CID assigned to the M2M device may not be valid in the new BS while an MGID can be used therein. That is, a CID used for specific M2M multicast connection in a previous BS can be used for other services in the current BS and a different CID can be used for M2M multicast connection allocated for the M2M device. In this case, when the M2M device that has received M2M multicast data from the previous BS is moved to a new BS, the M2M device cannot be provided with a service in the new BS. A description will be given of a method for solving the problem that the M2M device cannot be provided with a multicast service because it is moved.

<First Method for Solving the Problem that M2M Device Cannot be Provided with Multicast Service Due to Movement Thereof>

This method is a broadcast or multicast method. A BS may transmit, to an M2M device, information about a mapping between CIDs corresponding to M2M multicast service flows supported by the BS and CIDs used for the M2M multicast service flows in a neighbor BS through a broadcast message. A downlink channel descriptor (DCD) may be an example of a broadcast message transmitted for multicast CID update. In addition to the DCD, a new broadcast message or an existing broadcast message may be used for CID update and may be delivered in the TLV format. For example, the DCD and an M2M group MAC control (MGMC) message may be used for the purpose of CID update.

The following table 30 shows an exemplary broadcast message format for CID update.

TABLE 30

| Syntax | Size (bits) | Notes |
|---|---|---|
| Broadcast message for CID update { | | |
| ... | ... | ... |
| Num of Neighbor BSs<br>for(i=0;i<Num of Neighbor BSs; i++) { | 4 | |
| Num of M2M multicast CID_mapping<br>for(j=; j< Num of M2M multicast CID mapping; j++) { | 8 | |
| Current M2M multicast CID and New M2M multicast CID<br>} | 32 | |
| } | | |
| ... | ... | ... |
| } | | |

Referring to table 30, a current M2M multicast CID and new M2M multicast CID field indicate a current M2M multicast CID and an updated new multicast CID.

The broadcast message format shown in Table 30 may be used to update a CID when one CID indicates one multicast service flow in all M2M device groups. One CID indicates one MGID belonging to one M2M device group zone. In this case, an M2M device can check a current M2M multicast CID to recognize a multicast service flow corresponding to an MGID belonging to an M2M device group zone, which is indicated by the corresponding CID.

The following table 31 shows another exemplary broadcast message format for CID update.

TABLE 31

| Syntax | Size (bits) | Notes |
|---|---|---|
| Broadcast message for CID update { | | |
| ... | ... | ... |
| Num of Neighbor BSs | 4 | |
| for(i=0;i<Num of Neighbor BSs; i++) { | | |
| Num of M2M multicast CID_mapping | 8 | |
| for(j=; j< Num of M2M multicast CID mapping; j++) { | | |
| Current M2M multicast CID and New M2M multicast CID | 32 | |
| For(k=0;k<Num of MGID; k++) { | | |
| MGID | 15 | |
| } | | |
| } | | |
| } | | |
| ... | ... | ... |
| padding | | |
| } | | |

Referring to Table 31, if one CID maps to one or more MGIDs belonging to one M2M device group zone (i.e. when one CID indicates one or more multicast services in the same group zone), it is necessary for a broadcast message to include MGID information for representing which MGID corresponds to a corresponding CID when the corresponding CID is updated. That is, a CID assigned for MGIDs in one M2M device group zone cannot be used in other zones.

When one CID can be mapped to only one MGID belonging to one M2M device group zone and a CID assigned in one zone can be used for one MGID belonging to another M2M device group zone, the BS may include an M2M device group zone ID in a broadcast message in order to indicate a zone corresponding to a CID when updating the CID and transmit the broadcast message including the M2M device group zone ID to an M2M device. This is shown in Table 32.

TABLE 32

| Syntax | Size (bits) | Notes |
|---|---|---|
| Broadcast message for CID update { | | |
| ... | ... | ... |
| Num of Neighbor BSs | 4 | |
| for(i=0;i<Num of Neighbor BSs; i++) { | | |
| Num of M2M multicast CID_mapping | 8 | |
| for(j=; j< Num of M2M multicast CID mapping; j++) { | | |
| Current M2M multicast CID and New M2M multicast CID | 32 | |
| For(k=0;k<Num of MDGZ ID; k++) { | | |
| M2M DEVICE GROUP ZONE(MDGZ) ID | | |
| } | | |
| } | | |
| } | | |
| ... | ... | ... |
| Padding | | |
| } | | |

When one CID can be mapped to one or more MGIDs in one M2M device group zone and a CID assigned in one zone can be used for only one MGID belonging to another M2M device group zone, the BS may include an M2M device group zone ID and an MGID in a broadcast message, as shown in Table 33, in order to indicate a zone and an MGID corresponding to a CID when updating the CID and transmit the broadcast message including the M2M device group zone ID and the MGID to an M2M device.

TABLE 33

| Syntax | Size (bits) | Notes |
|---|---|---|
| Broadcast message for CID update { | | |
| ... | ... | ... |
| Num of Neighbor BSs | 4 | |
| for(i=0;i<Num of Neighbor BSs; i++) { | | |
| Num of M2M multicast CID_mapping | 8 | |
| for(j=; j< Num of M2M multicast CID mapping; j++) { | | |
| Current M2M multicast CID and New M2M multicast CID | 32 | |
| For(k=0;k<Num of MDGZ ID; k++) { | | |
| M2M DEVICE GROUP ZONE(MDGZ) ID | | |
| For(k=0;k<Num of MGID; k++) { | | |
| MGID | 15 | |
| } | | |
| } | | |
| } | | |
| } | | |
| ... | ... | ... |
| Padding | | |
| } | | |

Information included in a message may be represented in a TLV format, as shown in Table 34. Following MGID and M2M multicast CID mapping information TLV may be included in a broadcast/multicast MAC message (e.g. a DCD).

TABLE 34

| Name | Type | Size (bytes) | Value |
|---|---|---|---|
| MGID and M2M multicast CID mapping information TLV | Xx | Variable | Num of Neighbor BSs: 4 bits for (i=0; 1<Num of Neighbor BSs; i++) { Num of M2M multicast CID_mapping: 4 bits for (j=; j<Num of M2M multicast CID mapping; j++) { Current M2M multicast CID and New M2M multicast CID: 16 bits For (k=0; k<Num of MDGZ ID; k++) { M2M DEVICE GROUP ZONE (MDGZ) ID For (k=0; k<Num of MGID; k++) { MGID } } } } |

A description will be given of operations of M2M devices in an idle mode.

When an M2M device in an idle mode does not receive M2M multicast data, the M2M device need not update an M2M multicast CID even if the M2M device is moved between BSs in the same zone. When transmitting M2M multicast data to idle M2M devices, a BS may page the idle M2M devices by transmitting a paging message including an MGID and multicast traffic indication for group paging to the idle M2M devices, and then transmit the M2M multicast data to the idle M2M devices. An M2M device which has received the paging message including group paging corresponding to the multicast traffic indication can receive the multicast data without performing network entry.

If an idle M2M device does not receive multicast CID mapping information about a target BS from a previous BS when the M2M device moves to the target BS after being assigned an MGID and an M2M multicast CID by the previous BS through a DSA procedure, this idle M2M device may not receive multicast data, which is transmitted through resources allocated by a MAP IE including an M2M multicast CID, even though it receives the paging messaging including the multicast traffic indication and MGID. This is because the M2M device has the wrong M2M multicast CID mapped to the MGID.

To solve this problem, when the BS performs group paging in order to transmit multicast data to M2M devices in the idle mode, the BS can include not only an MGID but also an M2M multicast CID mapped to the MGID in a paging message and transmit the paging message to the M2M devices in the idle modes. When an MGID is considered to be used to identify one M2M group (or multicast connection for an M2M group) in an M2M device group zone, an M2M device group zone ID field for indicating which M2M device group zone includes the MGID may be included in the paging message and transmitted. The following table 35 shows an exemplary paging message MOB_PAG-ADV.

TABLE 35

| Syntax | Size (bits) | Notes |
|---|---|---|
| MOB_PAG-ADV message { | | |
| ... | ... | ... |
| For(i=0; <Num_MDGZID; i++) { | | MDGZID: M2M Device Group Zone ID |
| MDGZID | TBD | M2M Device Group Zone ID |
| For (i=0; i<Num_MGID; i++) { | | |
| MGID | 15 | |
| Action code | 2 | 0b00: Performing network reentry<br>0b01: Performing location update<br>0b10: Receiving multicast traffic without requiring network reentry<br>0b11: MGID re-assignment |
| ... | ... | ... |
| if(Action code ==0b10) { | | |
| Multicast transmission start time (MTST) | 8 | Least significant 8 bits of the frame number in which the ABS starts sending DL multicast data |
| M2M multicast CID | 16 | MGID mapped M2M multicast CID |
| } | | |
| ... | ... | ... |
| } | | |
| } | | |
| ... | | ...... |
| Padding | | |
| } | | |

Referring to table 35, the BS can transmit an M2M device group zone ID and an M2M multicast CID with an MGID when transmitting the paging message. The M2M device reads control information (MAP) for transmitting the multicast data using the M2M multicast CID corresponding to the MGID assigned thereto through the paging message. Specifically, upon reception of a MAP IE including the M2M multicast CID corresponding to the MGID assigned to the M2M device, the M2M device decodes an M2M multicast burst transmitted over a resource allocated through the MAP IE. Information included in a message may be represented in a TLV format, as shown in Table 36 (M2M device group zone ID TLV and M2M multicast CID TLV may be included in the paging message MOB_PAG-ADV).

TABLE 36

| Name | Type | Size (bytes) | Value |
|---|---|---|---|
| M2M multicast CID TLV | xxx | 16 | M2M multicast CID TLV |
| M2M Device Group Zone ID TLV | Xx | TBD | M2M Device Group Zone ID TLV |

When an idle M2M device which is receiving M2M multicast data moves to a target BS before transmission of the M2M multicast data is finished, the M2M device needs to update an M2M multicast CID if it does not have MGID and M2M multicast CID mapping information about the target BS. In this case, the M2M device can update the M2M multicast CID from the BS by executing a location update procedure. Here, the M2M device can transmit a ranging request message (e.g. RNG-REQ) having a ranging purpose indication set to M2M multicast CID update (#bit 6=1) to the BS. Upon reception of the ranging request message (e.g. RNG-REQ) having the ranging purpose indication set to M2M multicast CID update, the BS receives the MGID corresponding to the M2M device from the corresponding network, includes MGID and CID mapping information in a ranging response message (e.g. RNS-RSP) and transmits the ranging response message to the M2M device.

An example of the ranging request message (RNG-REQ) will now be described.

A TLV parameter may be included in the ranging response message when the M2M device attempts to perform network reentry, handover, location update or abnormal power-down reporting. A ranging purpose indication field in the ranging request message indicates an operation of the M2M device.

For example, when bit #0 of the ranging purpose indication field is set to 1, it indicates that an M2M device currently attempts to perform handover or reentry by being combined with a serving BS ID and indicates that the M2M device attempts to perform network reentry from an idle mode to the serving BS by being combined with a paging controller ID. When bit #1 of the ranging purpose indication field is set to 1, it indicates that the M2M device initiates an idle mode location update procedure. Bit #2 of the ranging purpose indication field indicates a seamless handover. When this bit is set to 1 by being combined with other included information elements, it indicates that the M2M device initiates ranging as part of a seamless handover. Bit #3 of the ranging purpose indication field indicates a ranging request for setting emergency call. When this bit is set to 1, it indicates an operation of an emergency call processor. Bit #4 of the ranging purpose indication field indicates MBS update. When this bit is set to 1, it indicates that the M2M device attempts to perform location update because service flow management encoding for MBS flow is required. Bit #5 of the ranging purpose indication field indicates abnormal power down. When this bit is set to 1, it indicates that abnormal or involuntary power down occurs in the M2M device. Bit #6 of the ranging purpose indication field indicates MGID and M2M multicast CID update. When this bit is set to 1, it represents that the M2M device attempts to perform location update in order to update current MGID and CID mapping information. Bit #7 of the ranging purpose indication field is reserved to indicate another purpose.

The ranging response message as a response to the ranging request message may include the following TLV parameters in order to update M2M multicast CIDs mapped to MGIDs assigned to M2M devices. For example, in an MGID and CID mapping information TLV parameter, bits #0 to #14 may be reserved for an MGID value, bits #15 to #30 may be reserved for an M2M multicast CID value, and bit #31 may be reserved for another information value.

When an M2M device updates an M2M multicast CID from a BS by performing a location update procedure, the M2M device may include ranging purpose indication information that indicates M2M multicast CID update and an MGID previously assigned to the M2M device in a ranging request message (e.g. RNG-REQ) and transmit the ranging request message to the BS. Upon reception of the ranging request message including the ranging purpose indication information indicating M2M multicast CID update and the MGID from the M2M device, the BS directly delivers CID mapping information about the MGID, which is included in an MGID list thereof, to the M2M device.

The ranging request message (e.g. RNS-REQ) may include a parameter such as MGID information TLV. In the MGID information TLV, bits #0 to #7 may be reserved for an MGID value.

A ranging response message as a response to the ranging request message may include an MGID and M2M multicast CID mapping information TLV parameter in order to update M2M multicast CIDs mapped to MGIDs assigned to M2M devices. For example, in the MGID and M2M multicast CID mapping information TLV parameter, bits #0 to #14 may be reserved for an MGID value, bits #15 to #30 may be reserved for an M2M multicast CID value, and bit #31 may be reserved for another information value.

When delivering MGID and M2M multicast CID mapping information, the BS may transmit an MGID bitmap and CID information about the MGID bitmap instead of MGIDs and CIDs. The MGID bitmap includes MGIDs aligned in increasing order. In the MGID bitmap, a bit set to 1 indicates that a CID mapped to the MGID corresponding to the bit needs to be updated. Accordingly, if the BS has received MGIDs on M2M devices from a network entity or the M2M devices, bits for all the MGIDs are set to 1. If the BS has received MGID and M2M multicast CID mapping information about the M2M devices from the network entity or the M2M devices through a ranging request message, only bits for MGIDs that require update are set to 1. This method can reduce ranging response message overhead.

As described above, the ranging response message as a response to the ranging request message may include a TLV parameter such as the MGID bitmap in order to update M2M multicast CIDs mapped to MGIDs assigned to M2M devices. For example, in the MGID bitmap TLV parameter, bits #0 to #7 may be reserved for the MGID bitmap. Alternatively, the ranging response message may include an M2M multicast CID TLV parameter in order to update M2M multicast CIDs mapped to MGIDs assigned to M2M devices. In the M2M multicast CID TLV parameter, bits #0 to #15 may be reserved for an M2M multicast CID value. The M2M multicast CID TLV parameter may include as many M2M multicast CID TLVs as the number of bits set to 1 in the MGID bitmap.

The MGID bitmap includes MGIDs aligned in increasing order. In the MGID bitmap, a bit set to 1 indicates that a CID mapped to the MGID corresponding to the bit needs to be updated. Accordingly, if the BS has received MGIDs on M2M devices from a network entity or the M2M devices, bits for all the MGIDs are set to 1. If the BS has received MGID and M2M multicast CID mapping information about the M2M devices from the network entity or the M2M devices through a ranging request message, only bits for MGIDs that require update are set to 1.

A description will be given of an operation of a connected mode M2M device using a unicast method.

When a connected mode M2M device has M2M multicast connection and hands over from a serving BS which assigns an M2M multicast CID to the M2M device to a target BS, the connected mode M2M device needs to be assigned an M2M multicast CID from the target BS. The serving BS may receive MGID and M2M multicast CID mapping information from the target BS during the handover procedure and transmit the received MGID and M2M multicast CID mapping information to the M2M device. That is, the serving BS can include MGID and M2M multicast CID information about the target BS in a handover request/response message (e.g. MOB_BSHO-REQ/RSP message), and transmit the handover request/response message to the M2M device. Here, the serving BS includes only CID information that needs to be updated in the handover request/response message.

The handover request/response message (e.g. MOB_BSHO-REQ/RSP message) may include a TLV parameter such as MGID and M2M multicast CID mapping information in order to update M2M multicast CIDs mapped to MGIDs assigned to M2M devices. For example, in the MGID and M2M multicast CID mapping information TLV parameter, bits #0 to #14 may be reserved for an MGID value, bits #15 to #30 may be reserved for an M2M multicast CID value, and bit #31 may be reserved for another information value. In this case, the serving BS can reduce overhead of related information by transmitting the message using the MGID bitmap.

Otherwise, the handover request/response message (e.g. MOB_BSHO-REQ/RSP message) may include a TLV parameter such as the MGID bitmap in order to update M2M multicast CIDs mapped to MGIDs assigned to M2M devices. For example, in the TLV parameter such as the MGID bitmap, bits #0 to #7 may be reserved for an MGID bitmap value. The MGID bitmap includes MGIDs aligned in increasing order. In the MGID bitmap, a bit set to 1 indicates that a CID mapped to the MGID corresponding to the bit needs to be updated. Accordingly, if the BS has received MGIDs on M2M devices from a network entity or the M2M devices, bits for all the MGIDs are set to 1. If the BS has received MGID and M2M multicast CID mapping information about the M2M devices from the network entity or the M2M devices through the handover request/response message, only bits for MGIDs that require update are set to 1. Furthermore, the handover request/response message (e.g. MOB_BSHO-REQ/RSP message) may include an MGID and M2M multicast CID mapping information TLV parameter in order to update M2M multicast CIDs mapped to MGIDs assigned to M2M devices. For example, in the MGID and M2M multicast CID mapping information TLV parameter, bits #0 to #15 may be reserved for an MGID multicast CID value. The MGID and M2M multicast CID mapping information TLV parameter may include as many M2M multicast CID TLVs as the number of bits set to 1 in the MGID bitmap. Even in this case, the serving BS can reduce overhead of related information by transmitting the message using the MGID bitmap. An M2M device may perform CID update when performing ranging to a target BS after a handover rather than during handover. The target BS may include MGID and M2M multicast CID information in the ranging response message (e.g. RNG-RSP message) and transmit the ranging response message to the M2M device.

The ranging response message may include a TLV parameter such as an MGID and M2M multicast CID in order to update M2M multicast CIDs mapped to MGIDs assigned to M2M devices. For example, in the TLV parameter such as the MGID and M2M multicast CID, bits #0 to #14 may be reserved for an MGID bitmap, bits #0 to #15 may be reserved for an M2M multicast CID value, and bit #31 may be reserved for another information value. In this case, the serving BS can reduce overhead of related information using the MGID bitmap.

Otherwise, the ranging response message may include a TLV parameter such as the MGID bitmap. For example, in the TLV parameter such as the MGID bitmap, bits #0 to #7 may be reserved for an MGID bitmap value. The MGID bitmap includes MGIDs aligned in increasing order. In the MGID bitmap, a bit set to 1 indicates that a CID mapped to the MGID corresponding to the bit needs to be updated. Accordingly, if the BS has received MGIDs on M2M devices from a network entity or the M2M devices, bits for all the MGIDs are set to 1. If the BS has received MGID and M2M multicast CID mapping information about the M2M devices from the network entity or the M2M devices through a ranging request, only bits for MGIDs that require update are set to 1. Alternatively, the ranging response message may include an M2M multicast CID TLV parameter in order to update M2M multicast CIDs mapped to MGIDs assigned to M2M devices. For example, in the M2M multicast CID TLV parameter, bits #0 to #15 may be reserved for an M2M multicast CID value. The M2M multicast CID TLV parameter may include as many M2M multicast CID TLVs as the number of bits set to 1 in the MGID bitmap.

When the M2M device performs ranging after a handover, the M2M device may insert an M2M multicast update required field in the ranging request message (RNG-REQ) to be transmitted, as in the above-defined operations of idle mode M2M devices. When the M2M multicast update required field is set to 1, the BS may transmit the above-defined MGID and M2M multicast CID mapping information TLV, MGID bitmap TLV or M2M multicast CID TLV through the ranging response message.

The ranging request message may include an M2M multicast update required TLV parameter. For example, in the M2M multicast update required TLV parameter, bit #0 indicates that an M2M device needs to update the M2M multicast CID when this bit is set to 1. The BS delivers MGID and M2M multicast CID mapping information about the M2M device. Bits #1 to #7 may be reserved for another information value.

In this scenario, the M2M device may include MGID information or MGID and M2M multicast CID mapping information with the M2M multicast update required TLV in the ranging request message and transmit the ranging request message to the BS as in the above-defined operations of idle mode M2M devices.

The ranging request message may include an MGID information TLV parameter. In the MGID information TLV parameter, for example, bits #0 to #14 may be reserved for an MGID value and bit #15 may be reserved for another information value.

The ranging request message may include an MGID and M2M multicast CID mapping information TLV parameter. In the MGID and M2M multicast CID mapping information TLV parameter, for example, bits #0 to #14 may be reserved for an MGID value and bits #15 to #30 may be reserved for an M2M multicast CID value, and bit #31 may be reserved for another information value.

When the BS periodically transmits MGIDs and M2M multicast CIDs about neighbor BSs through a broadcast/multicast message (DCD or new broadcast/multicast message), most connected mode M2M devices can acquire MGID and M2M multicast CID mapping information about the neighbor BSs through the broadcast/multicast message. If an M2M does not obtain the MGID and M2M multicast CID mapping information about the neighbor BSs through the broadcast/multicast message due to rapid movement thereof, the M2M device moves to the target BS and transmits the ranging request message having the M2M multicast update required field set to 1 to the BS. Then, the BS inserts the MGID and M2M multicast CID mapping information in the ranging response message and transmits the ranging response message to the M2M device only when the M2M multicast update required field is set to 1.

If a connected mode M2M device performs a CID update procedure during a handover, the M2M device can include M2M multicast update required TLV in a MOB_MSHO-REQ message and transmit the MOB_MSHO-REQ message to the BS to request CID update only when the M2M device cannot obtain CID update information through the broadcast message. The BS can include MGID and M2M multicast CID mapping information TLV or MGID bitmap TLV and M2M multicast CID TLV in a MOB_BSHO-RSP message and transmit the MOB_BSHO-RSP message to the M2M device only upon receiving a MOB_BSHO-REQ message having M2M multicast update required TLV set to 1.

An M2M device (or MS) handover request message (e.g. MOB_MSHO-REQ message) may include an M2M multicast update required TLV parameter. In the M2M multicast update required TLV parameter, bit #0 set to 1 indicates that the M2M device needs to update the M2M multicast CID. Then, the BS delivers MGID and M2M multicast CID mapping information about the M2M device to the M2M device. Other bits #1 to #7 may be reserved for another information value.

In this scenario, the M2M device may include MGID information TLV or MGID and M2M multicast CID mapping information TLV with M2M multicast update required TLV in the M2M device (or MS) handover request message (e.g. MOB_MSHO-REQ) and transmit the M2M device (or MS) handover request message. Upon reception of the M2M device (or MS) handover request message including the MGID information TLV, the BS can include MGID and M2M multicast CID mapping information TLV in an M2M device (or MS) handover response message (e.g. MOB_BSHO-RSP message) and transmit the M2M device (or MS) handover response message to the M2M device. Upon reception of the M2M device (or MS) handover request message (MOB_MSHO-REQ message) including MGID and M2M multicast CID mapping information TLV, the BS can include MGID bitmap TLV and M2M multicast CID TLV in the M2M device (or MS) handover response message (e.g. MOB_BSHO-RSP message) and transmit the M2M device (or MS) handover response message to the M2M device.

The M2M device (or MS) handover request message may include an MGID and M2M multicast CID mapping information TLV parameter. In the MGID and M2M multicast CID mapping information TLV parameter, for example, bits #0 to #14 may be reserved for an MGID value, bits #15 to #30 may be reserved for an M2M multicast CID value, bit #31 may be reserved for another information value.

Alternatively, the M2M device (or MS) handover request message may include an MGID bitmap TLV parameter. In the MGID bitmap TLV parameter, for example, bits #0 to #7 may be reserved for an MGID bitmap value. The MGID bitmap includes MGIDs aligned in increasing order. In the MGID bitmap, a bit set to 1 indicates that a CID mapped to the MGID corresponding to the bit needs to be updated. Accordingly, if the BS has received MGIDs on M2M devices from a network entity or the M2M devices, bits for all the MGIDs are set to 1. If the BS has received MGID and M2M multicast CID mapping information about the M2M devices from the network entity or the M2M devices through a ranging request, only bits for MGIDs that require update are set to 1.

Alternatively, the M2M device (or MS) handover request message may include an M2M multicast CID TLV parameter. In the M2M multicast CID TLV parameter, bits #0 to #15 may be reserved for an M2M multicast CID value. The M2M multicast CID TLV parameter may include as many M2M multicast CID TLVs as the number of bits set to 1 in the MGID bitmap.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an exemplary embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method for receiving/transmitting multicast data according to the various embodiments of the present invention is industrially applied to wireless communication system such as 3GPP LTE, LTE-A, IEEE 802.16, and like that.

The invention claimed is:
1. A method of receiving multicast data at a machine-to-machine (M2M) device in a wireless communication system, the method comprising:
receiving, from a base station (BS), an M2M multicast connection identifier for an M2M multicast service assigned to the M2M device and an M2M group identifier (MGID) assigned to the M2M device,
wherein the M2M multicast connection identifier is used by the M2M device to identify the MGID;
receiving, from the base station, M2M multicast assignment control information, the M2M multicast assignment control information including resource information for multicast data transmission;
decoding the M2M multicast assignment control information using the MGID;
receiving, from the base station, the multicast data based upon the resource information, the multicast data corresponding to the M2M multicast connection identifier.

2. The method according to claim 1, wherein the M2M multicast connection identifier and the MGID are received during a dynamic service addition (DSA) procedure.

3. The method of claim 1, wherein the M2M multicast assignment control information comprise an M2M multicast assignment A-MAP IE.

4. The method of claim 1, wherein the M2M multicast connection identifier and the MGID are received during a dynamic service addition (DSA) procedure.

5. A machine-to-machine (M2M) device for receiving multicast data in a wireless communication system, the M2M device comprising:
a receiver configured to
receive an M2M multicast connection identifier for an M2M multicast service assigned to the M2M device and an M2M group identifier (MGID) assigned to the M2M device,
wherein the M2M multicast connection identifier is used by the M2M device to identify the MGID; and
receive, from the base station, M2M multicast assignment control information, the M2M multicast assignment control information including resource information for multi cast data transmission; and
a processor configured to decode the M2M multicast assignment control information using the MGID,
wherein the receiver is further configured to receive, from the base station, the multicast data based upon the resource information, the multicast data corresponding to the M2M multicast connection identifier.

6. The M2M device of claim 5, wherein the receiver is further configured to receive the M2M multicast connection identifier and the MGID during a dynamic service addition (DSA) procedure.

7. The M2M device of claim 5, wherein the M2M multicast assignment control information comprise an M2M multicast assignment A-MAP IE.

\* \* \* \* \*